US 8,566,449 B2

(12) United States Patent
Guest et al.

(10) Patent No.: US 8,566,449 B2
(45) Date of Patent: Oct. 22, 2013

(54) METHOD AND SYSTEM FOR VALIDATING CONFIGURATION DATA IN A MULTI-TENANT ENVIRONMENT

(75) Inventors: Ryan Guest, Stockton, CA (US); Jayesh Sureshchandra, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 430 days.

(21) Appl. No.: 13/090,093

(22) Filed: Apr. 19, 2011

(65) Prior Publication Data

US 2012/0144023 A1 Jun. 7, 2012

Related U.S. Application Data

(60) Provisional application No. 61/419,599, filed on Dec. 3, 2010.

(51) Int. Cl.
*G06F 15/16* (2006.01)

(52) U.S. Cl.
USPC ........................... 709/226; 709/223; 709/245

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,269,378 B1 * | 7/2001 | Quirt ..................................... 1/1 |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |

(Continued)

*Primary Examiner* — Patrice Winder
(74) *Attorney, Agent, or Firm* — Ingrassia Fisher & Lorenz, P.C.

(57) ABSTRACT

Validation systems and methods are described to validate domain name services (DNS) or other configuration data for multiple network services provided by a common multi-tenant application server. A validation system suitably receives configuration data from the multi-tenant application server for each of the services provided. The validation system also performs a validation query to a domain name services or other public service on the network to obtain public data about each service. The publicly-available information is compared to the data received from the multi-tenant application server, and any anomalies are reported and/or repaired as appropriate.

20 Claims, 2 Drawing Sheets

(56) References Cited

U.S. PATENT DOCUMENTS

Figure 1:
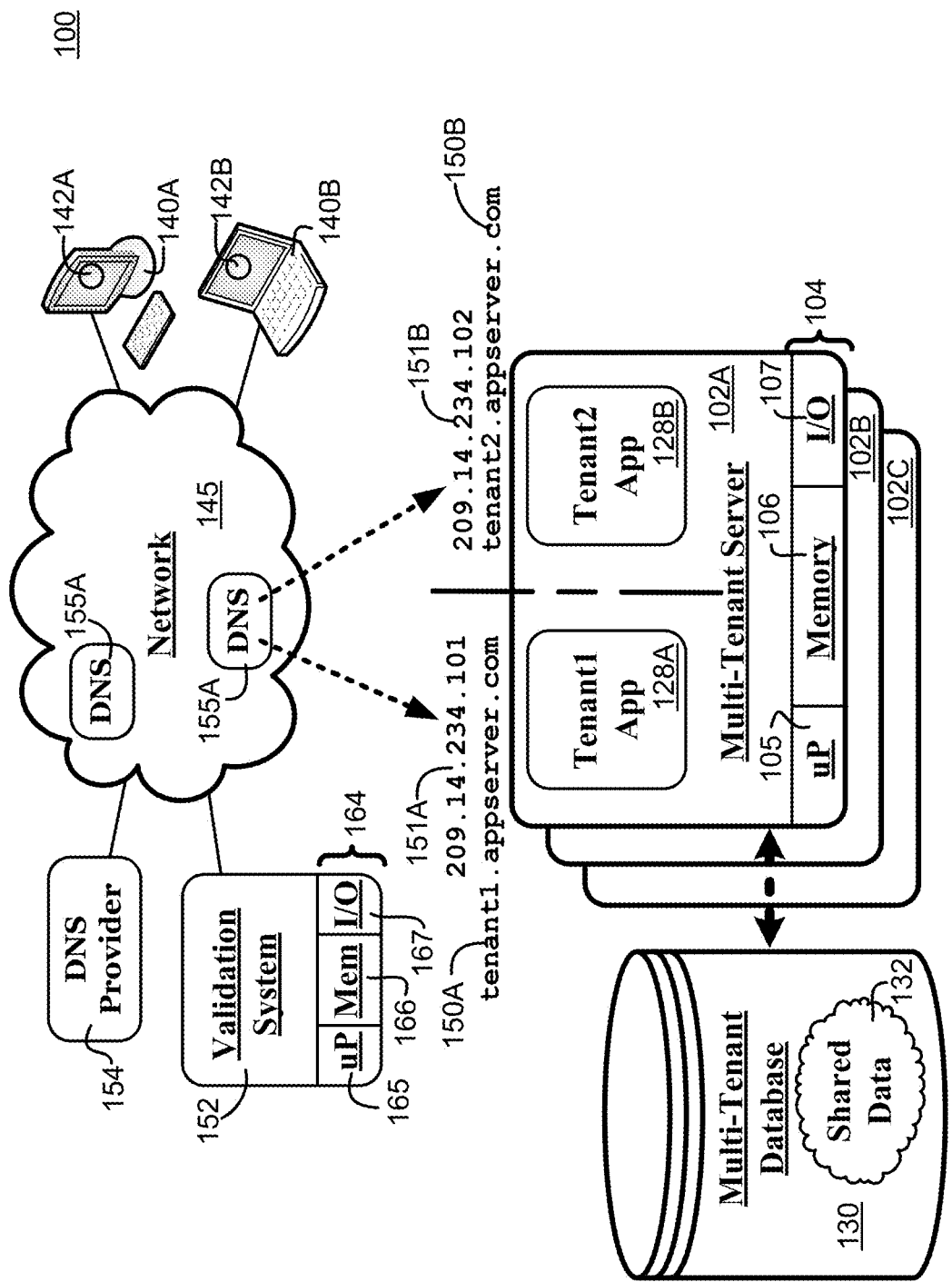

| | | |
|---|---|---|
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,698,160 B2 | 4/2010 | Beaven et al. |
| 7,930,428 B2 * | 4/2011 | Drako ............................ 709/245 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,321,551 B2 * | 11/2012 | Gardner ........................ 709/223 |
| 8,423,607 B2 * | 4/2013 | Saleem et al. ................ 709/203 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0060054 A1 * | 3/2008 | Srivastava ........................ 726/2 |
| 2009/0089438 A1 * | 4/2009 | Agarwal et al. ............... 709/228 |
| 2012/0036179 A1 * | 2/2012 | Hegde et al. .................. 709/203 |

* cited by examiner

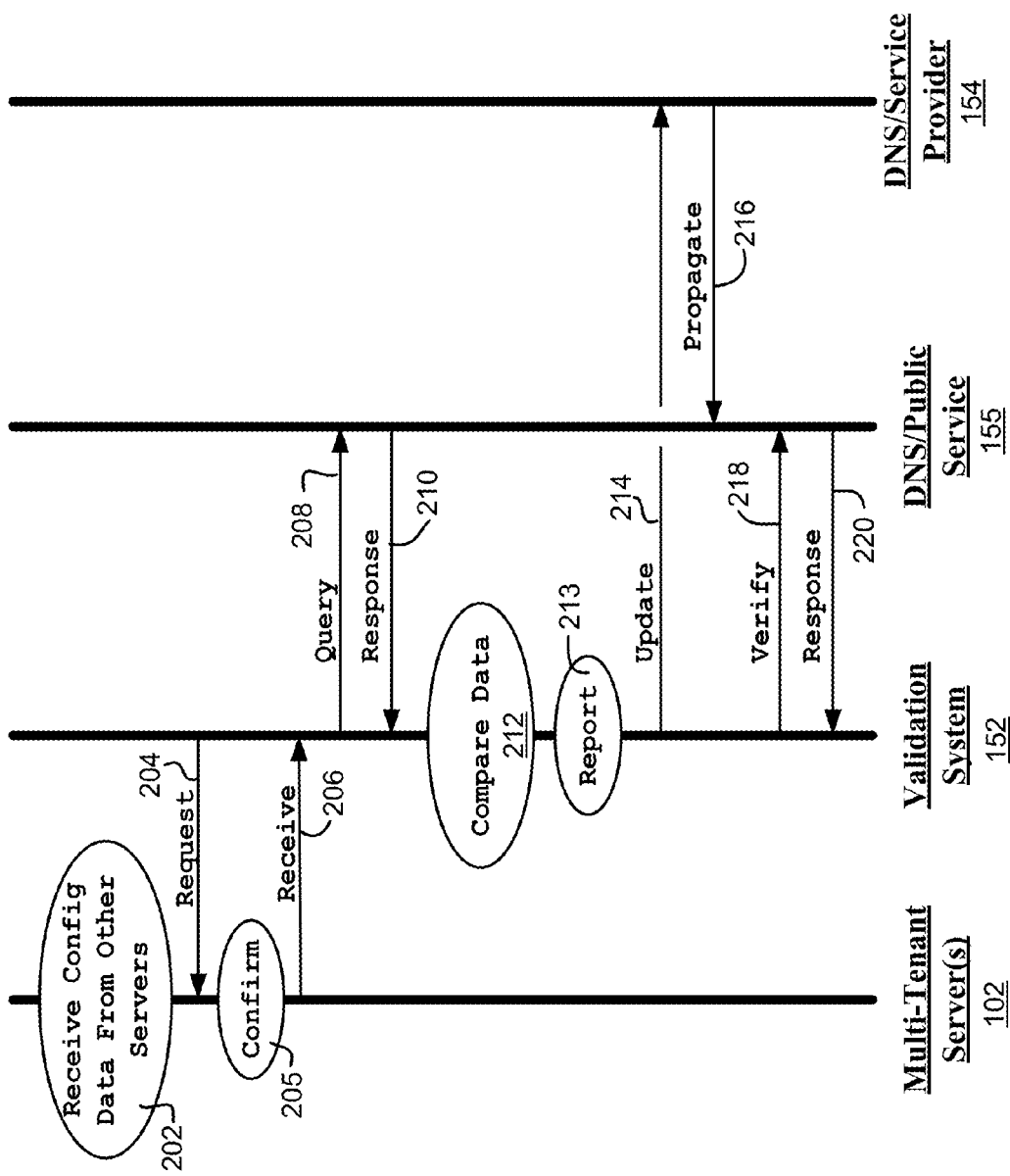

METHOD AND SYSTEM FOR VALIDATING CONFIGURATION DATA IN A MULTI-TENANT ENVIRONMENT

PRIORITY CLAIM

This application claims priority to U.S. Provisional Application Ser. No. 61/419,599, which was filed on Dec. 3, 2010 and is incorporated herein by reference.

TECHNICAL FIELD

The following relates to data processing systems and processes that use common network-based platforms to support applications executing on behalf of multiple tenants.

BACKGROUND

Modern software development is evolving away from the client-server model toward "cloud"-based processing systems that provide access to data and services via the Internet or other networks. In contrast to prior systems that hosted networked applications on dedicated server hardware, the cloud computing model provides applications over the network "as a service". The cloud computing model can often provide substantial cost savings to the customer over the life of the application because the customer no longer needs to provide dedicated network infrastructure, electrical and temperature controls, physical security and other logistics in support of dedicated server hardware.

In particular, multi-tenant cloud-based architectures have been developed to improve collaboration, integration and community-based improvement between customer tenants without sacrificing data security. Generally speaking, multi-tenancy refers to a system wherein a single hardware and software platform simultaneously supports multiple customers or other groups of users from a common data store. The shared platform in the multi-tenant architecture is usually designed to virtually partition data and operations so that each tenant works with a unique virtual application instance. The Force.com service available from salesforce.com of San Francisco, Calif., for example, provides an application-centric approach that abstracts the server hardware altogether and allows multiple tenants to simultaneously yet securely implement a wide variety of applications that are accessible via the Internet or a similar network.

In some instances, the different applications provided by a particular multi-tenant server are accessed via unique names and addresses. Certain tenants, for example, may wish to provide their applications from the shared server using customized domain names that uniquely identify the tenant's applications, and that differentiate that tenant's applications from those belonging to other tenants of the same shared server. A single multi-tenant server may therefore simultaneously support applications that are accessible via any number of different domain names.

The various domain names used to access the different applications can be published to users using the well-known Internet domain name service (DNS), or the like. Issues can arise, however, in maintaining consistency between multi-domain application servers and the publicly-available DNS service. If the public DNS becomes incorrect for any reason, then users may have difficulty in connecting to desired applications. It is therefore desirable to maintain the reliability and consistency of DNS information and/or other configuration data relating to multi-domain application servers, particularly when such servers support applications that are accessible via multiple distinct domains. Similar issues may arise in maintaining consistency and accuracy of other configuration information as well.

DESCRIPTION OF THE DRAWING FIGURES

Exemplary embodiments will hereinafter be described in conjunction with the following drawing figures, wherein like numerals denote like elements, and FIG. 1 is a diagram showing an exemplary embodiment of a system for validating configuration information for a multi-tenant application service; and FIG. 2 is a diagram showing an exemplary process for validating configuration information for a multi-tenant application service.

DETAILED DESCRIPTION

Various systems and methods are described to validate domain name services (DNS) or other configuration data for multiple services provided on a network by a common multi-tenant application server. In various embodiments, a validation system suitably receives configuration data from the multi-tenant application server for each of the services provided. The validation system also performs a validation query to a domain name services or other public service on the network to obtain public data about each service. The publicly-available information is compared to the data received from the multi-tenant application server, and any anomalies are reported and/or repaired as appropriate.

Various processes and systems described herein are able to validate that the distributed DNS data and/or other configuration information is correct. Some embodiments may alternately or additionally provide for dynamically-correcting incorrect or outdated information. Although this document primarily refers to exemplary embodiments that validate and/or repair DNS configuration data, other embodiments may relate to other types of real-time validation of production configurations that may be useful to applications and servers in a multi-tenant cloud computing infrastructure. The various systems and methods disclosed herein are not limited to DNS applications, then, but may equivalently apply to any number of other dynamic configuration systems, data or applications as appropriate. For example, equivalent systems and processes could be used to validate and/or repair load balancing information, routing tables, configurations of social media accounts, and/or any other configuration data as appropriate.

Turning now to the drawing figures and with initial reference to FIG. 1, an exemplary system 100 for providing client applications 128A-B associated with multiple distinct tenants suitably includes one or more application servers 102A-C, one or more databases 130, and a validation system 152. In many embodiments, each server 102A-C suitably supports multiple applications 128A-B associated with different tenants based upon securely-shared data 132 in database 130. Each application 128A-B suitably provides information or other services to one or more client applications 142A-B executing on one or more client computer systems 140A-B, respectively.

Generally speaking, a user of a client system 140 suitably invokes a browser or other client program 142 that is able to contact an appropriate server application 128 executing on a multi-tenant server 102 via the Internet or another network 145. Typically, client program 142 and/or another process executing on client system 140 accesses the application 128 on network 145 using an IP or other network address 151. Browsers and other client applications 128 generally obtain internet protocol (IP) or other addresses associated with various services available on the Internet or another network using a widely-available domain name services ("DNS") system 155. The DNS system 155 typically includes multiple servers 155A-B that are distributed throughout the Internet or another network 145 to associate textual domain names (e.g., "salesforce.com") with Internet Protocol (IP) or similar addresses (e.g., "204.14.234.33").

Different applications 128A-B executing in a multi-tenant server 102 can each be mapped to different domain names 150A-B that are each separately accessible via the Internet or another network 145. This can allow different tenants to each provide their applications 128 using a unique domain name 150 that is different from other users of the same shared server 102. Even if two hypothetical tenants (e.g., "Acme Fireworks Inc." and "Joe's Bait and Tackle") were to develop applications using the same multi-tenant server 102, then, the two tenants' applications 128 could be separately accessible via different domain names 150 (e.g., "acme.multiserver.com" and "fishing.multiserver.com", respectively). The separate domain names could reference a common network address 151 associated with the common server 102, or different network addresses 150A-B each associated with the particular application as desired. In the example illustrated in FIG. 1, the DNS system 155 suitably maps domain names 151-B associated with two different tenant applications 128A-B (e.g., "tenant1.appserver.com" and "tenant2.appserver.com") with two different IP addresses 151A-B (e.g., 209.14.214.101 and 209.14.214.102), respectively. The DNS service 155 in this example associates each of the distinct domain names 150 with a separate IP or other network address 151 that can be used to locate the particular application 128 on network 145, thereby facilitating connections between client applications 142A-B and tenant applications 128A-B using different domain names 150A-B. Other embodiments may be designed such that a common network address 151 corresponding to the application server 102 is used for each of the different domain names 150A-B that are hosted by that particular server 102. Different embodiments may supplement or modify this example, as appropriate.

Invalid data may propagate through the DNS system 155 for any number of reasons. In some circumstances, for example, an initial DNS entry created for a particular application 128 may fail to register due to network or system issues. As another example, DNS entries may be slow to update and/or may fail to update entirely as tenants move between different network server instances (e.g., between servers 102A-C), or as applications 128 change over time. Such issues may not be reported in a timely fashion due to asynchronous nature of the DNS system 155. Other types of configuration data may experience similar issues.

To validate DNS or other configuration data for the multiple applications 128A-B executing on servers 102A-C, then, a validation system 152 obtains configuration information from the server(s) 102A-C and compares the information obtained directly from the primary source (e.g., the server 102) with the information distributed from the DNS or other distribution service 155 on network 145. If any anomalies are found, these may be reported out to an administrator or other user for manual repair.

Further embodiments may additionally or alternately automatically repair any anomalies by updating a provider service 154 that updates the information propagated on network 145 by the DNS or other distribution service 155. Examples of DNS services 155 include the services provided by ULTRADNS, GODADDY.COM, and many others. Many of these services 155 include application programming interfaces (APIs) or other interfaces that allow programs, scripts or other validation systems 152 to automatically update DNS or other configuration information. Such services 155 typically ensure that received information is appropriately distributed or otherwise propagated throughout the public DNS or other distribution system 155.

The operation of an exemplary process for validating DNS or similar configuration data is described in detail below with respect to FIG. 2. The following discussion, however, continues to provide additional detail about the various hardware and software systems illustrated in FIG. 1.

Validation system 152 may be implemented using any appropriate computing hardware 164, software, firmware and/or the like. In some embodiments, validation system 152 is implemented using a software application or script that is stored and executed on general-purpose computing hardware 164, such as the processor 165, memory 166 and input/output features 167 commonly associated with a conventional personal computer, server or other computing system. In other embodiments, validation system 152 may reside on the same computing hardware 104 used to execute and implement one or more application servers 102. Still other embodiments may implement validation system 152 using other types of hardware and/or software, including any sort of workstation-based, cloud-based, server-based and/or other computing resources that may be available. The actual data processing and algorithms described herein may be implemented using any sort of programming or scripting features, including any sort of Perl, Python, Ruby or similar scripts that manually or automatically execute on any temporal basis; any sort of compiled or interpreted application, applet or the like in any source or object code format (e.g., a Java Servlet-type application); and/or the like.

The exemplary multi-tenant application system 100 illustrated in FIG. 1 suitably includes a one or more application servers 102A-C. Each of these applications servers 102A-C dynamically creates and executes virtual applications 128A-B based upon data 132 from a common database 130 that is shared between multiple tenants. Data and services generated by the virtual applications 128A-B are provided via network 145 to any number of client devices 140A-B, as desired. In many implementations, virtual applications 128A-B are generated at run-time using a common platform that securely provides access to data 132 in database 130 for each of the various tenants subscribing to system 100. Other implementations may generate applications 128A-B in any other manner.

In this context, a "tenant" generally refers to a group of users that shares access to common data within database 130. Tenants may represent customers, customer departments, business or legal organizations, and/or any other entities that maintain data for particular sets of users within system 100. Although multiple tenants may share access to a common server 102 and database 130, the particular data and services provided from server 102 to each tenant can be securely isolated from those provided to other tenants, as needed. The multi-tenant architecture therefore allows different sets of users to share functionality without necessarily sharing each other's data 132.

Database 130 is any sort of repository or other data storage system capable of storing and managing data 132 associated with any number of tenants. Database 130 may be implemented using any type of conventional database server hardware. In various embodiments, database 130 shares processing hardware 104 with server 102. In other embodiments, database 130 is implemented using separate physical and/or virtual database server hardware that communicates with server 102 to perform the various functions described herein. Although only one database 130 supporting multiple application servers 102A-C is illustrated in FIG. 1, alternate embodiments may use multiple databases 130 to support different servers 102A-C or for any other purpose.

Each application server 102A-C in this example is implemented using one or more actual and/or virtual computing systems that collectively provide a dynamic application platform for generating virtual applications 128A-B. Server 102 operates with any sort of conventional computing hardware 104, such as any processor 105, memory 106, input/output features 107 and the like. Processor 105 may be implemented using one or more of microprocessors, microcontrollers, processing cores and/or other computing resources spread across any number of distributed or integrated systems, including any number of "cloud-based" or other virtual systems. Memory 106 represents any non-transitory short or long term storage capable of storing programming instructions for execution on processor 105, including any sort of random access memory (RAM), read only memory (ROM), flash memory, magnetic or optical mass storage, and/or the like. Input/output features 107 represent conventional interfaces to networks (e.g., to network 145, or any other local area, wide area or other network), mass storage, display devices, data entry devices and/or the like. In a typical embodiment, processing resources, communications interfaces and other features of hardware 104 using any sort of conventional or proprietary operating system. As noted above, server 102 may be implemented using a cluster of actual and/or virtual servers operating in conjunction with each other, typically in association with conventional network communications, cluster management, load balancing and other features as appropriate.

Data and services provided by server 102 can be retrieved using any sort of personal computer, mobile telephone, tablet or other network-enabled client device 140 on network 145. Typically, the user operates a conventional browser or other client program 142 to contact server 102 via network 145 using, for example, the hypertext transport protocol (HTTP) or the like. HTTP or other communications based upon the TCP/IP protocol stack may use the IP addresses 151 described above; other types of protocols (e.g., voice or other telephony protocols, military protocols, secure or proprietary protocols and/or the like) may equivalently use different types of addresses 151 as appropriate.

FIG. 2 shows an exemplary process 200 for validating DNS addresses 151 and/or other configuration data. Generally speaking, validation system 152 is able to validate configuration information for any number of multi-tenant application servers 102 by obtaining configuration data from the multi-tenant server 102 (function 206), obtaining configuration information from a DNS or other publicly-available service 155 (function 210), comparing the data obtained from the application server 102 with the information from the public service 155 (function 212), and reporting (function 213) and/or repairing any anomalies identified (function 214). These functions may be executed by any sort of hardware, software or other logic executing within validation system 152, as appropriate. Many alternate but equivalent implementations may be supplemented or modified in any manner.

In various embodiments that support two or more application servers 102, the various servers 102 may share configuration information with each other as appropriate (function 202). The servers 102A-C in FIG. 1, for example, may be configured to replicate DNS data or other configuration information so that each server 102 has a current and accurate copy of the configuration information for all of the servers 102A-C. Exchanges or updates of configuration information may be scheduled on any regular or irregular time basis. Equivalently, configuration updates may be shared between servers 102A-C in real time (or near real time) as changes are made to the data. Other embodiments may use different data sharing arrangements or schedules, as desired.

Configuration data may be obtained from one or more application servers 102 in any manner (function 206). In various embodiments, the validation system 152 requests configuration data from the server(s) 102 (function 204). Data may be requested in response to an administrator or other user manually executing a software program or script on validation system 152, for example. Alternately, requests 204 may be automatically scheduled (e.g., using a CRON-type scheduler executing on validation system 152) to execute on any regular or irregular time basis. Still other embodiments may schedule requests 204 for configuration data at times when application server 102 is known to be relatively idle, or at times when application server 102 is observed or expected to have a relatively low processing load (e.g., during hours when most users of the particular system are asleep, during weekends or holidays, or the like). Although FIG. 2 shows only one request 204 placed to a single server 102 that can be used to obtain configuration data 206 from multiple servers 102 due to the sharing function 202, other embodiments may place multiple requests 204 to any number of other servers 102 to separately obtain configuration data 206 from those servers as needed. The various requests 204 to different servers 102 may be staggered in time, or placed at the same time, as appropriate.

In some implementations, application server 102 confirms that validation system 152 is authorized to receive configuration data (function 205). Some implementations may simply check the IP or other address of validation system 152 to verify that the request 204 is originating from a particularly-known system, or at least a system that is operating within an approved network, subnet, domain, address range and/or other approved location. Other implementations may include further security mechanisms to require validation system 152 to provide a credential (e.g., userid/password, digital signature, biometric data and/or other credential) prior to receiving the configuration data.

Configuration data is received in any format (function 206). Configuration data may be received in a batch mode, for example, or data about particular domains or other settings may be individually received as desired. Various embodiments may provide the requested data in any organized format, such as a table or the like. DNS data, for example, could be provided as a table with each listing representing information for a particular domain supported by application server 102. The listing for each domain may include, for example, the domain text, an identifier of the tenant associated with the domain, an identifier of a particular application server 102A-C that hosts applications associated with the domain or tenant, and/or a description of the domain as follows:

DOMAIN_NAME:TENANT_ID:INSTANCE:DESCRIPTION

To continue the "Acme" and "Joe's Bait and Tackle" example presented above, an exemplary data structure that includes data about these two domains could appear, in one embodiment, as follows:

acme:00D000000000001:NA1:Acme Fireworks Inc.
fishing:00D000000000002:NA4:Joe's Bat & Tackle Other embodiments may store additional information or different information for some or all domains, as desired. If the domains are hosted under different network addresses, for example, the particular network address may be provided in the data structure as well. Further, configuration data may be provided in any other manner, such as an XML, JSON or other format. Still other embodiments may provide the configuration data using a RESTful or other interface, as desired.

The validation system 152 queries (function 208) the public DNS service 155 (or another information service on network 145 as appropriate) to obtain the publicly-distributed information for the same domains (function 208). The public information may be received in any manner (function 210). In various embodiments that process DNS configuration information, public DNS information may be obtained through conventional NSLOOKUP queries to a DNS service 155 on network 145. An exemplary NSLOOKUP response 210 from service 155 may appear as follows:

Non-authoritative answer:
acme.appserver.com canonical name=na1.appserver.com.
Name: na1.appserver.com
Address: 209.14.234.101

In this example, an NSLOOKUP query on the "acme.appserver.com" domain shows that the public information available from the DNS system 155 associates the domain with a server "na1.appserver.com" at the IP address 209.14.234.101. Other embodiments would provide additional and/or different information as appropriate. For example, information returned from ping, host, dig and/or other queries may be equivalently processed, as desired.

"Public" in this context simply means that the information is distributed or made available on network 145. If network 145 is a private or non-public network, the information provided by service 155 may not be available to members of the general public even though the information is "public" to users of network 145.

Rather than querying each domain individually, as described above, equivalent embodiments may simply request information about an entire domain or range of network addresses as appropriate. For example, some DNS systems 155 may support "zone file" or similar queries 208 that provide a listing of all domains associated with a particular network address, a particular range of network addresses, or a particular higher-level domain name (e.g., all of the subdomains associated with "appserver.com" or the like). Receiving and parsing a batch list may be more efficient than positing individual queries 208 in some embodiments.

Data received in function 206 and/or information received in function 210 can be parsed and stored in memory at the validation system 152 as appropriate. The configuration data 206 received from the application server 102 is then compared (function 212) to configuration information 210 received from the public service 155 to identify any anomalies between the two. As noted above, the parsing and comparing functions may be performed by a software application, applet, script (e.g., a PYTHON script) or the like executing on validation system 152.

Any differences or other anomalies between the server data 206 and the public information 210 may be reported out as desired (function 213). The report may be provided to a file or display that is readable by a human operator, for example. Reports of one or more anomalies may also be provided via email, text message, RSS or similar data feed, instant message and/or any other format, as desired. Other embodiments may report the anomalies to another data processing routine that is able to make changes or otherwise repair the anomalies, as desired.

Various embodiments may further repair any differences or other anomalies that are identified (function 214). Anomalies may be repaired on an automatic basis without further intervention from the administrator or user, or on a manual basis wherein the administrator initiates repair of one or more anomalies. To update the information for a particular domain name, for example, the validation system suitably contacts a service provider 154 using an API or other interface that allows changes to the configuration information. In some cases, configuration information may be updated by replacing the current entry entirely (e.g., by deleting the current entry and then adding a new entry as a replacement).

The updated configuration information then propagates throughout the DNS or other public service 155, as appropriate (function 216). Typically, service provider 154 has automated processes for distributing the updated information to the public service 155 to ensure adequate distribution on a relatively timely manner, considering the nature and scope of the DNS or other distribution service 155.

Various embodiments may additionally verify that the updated information is being distributed by service 155 (functions 218, 220). After a suitable period of time has elapsed to allow the updated information to propagate through the network, validation system 152 may place a subsequent query 218 to the DNS or other public service 155 and process the resulting response 220 to verify that the information about the domain is correct. The successful and/or unsuccessful results may be reported to an administrator, user or other process as desired.

As noted above, the various functions and features of process 200 may be carried out with any sort of hardware, software and/or firmware logic that is stored and/or executed on any platform. Some or all of method 200 may be carried out, for example, by logic executing within one or more systems shown in FIG. 1. For example, various functions shown in FIG. 2 (e.g., functions 202, 204, 206) may be partially or entirely implemented using software or firmware logic that is stored in memory 106 and executed by processor 105 as part of one or more application platforms 102A-C. Other features (e.g., functions 204, 206, 208, 210, 212, 214, 218, 220) may be partially or entirely executed using software, firmware or other logic that is stored and executed by hardware 164 or other features of validation system 152, as appropriate. The particular hardware, software and/or firmware logic that implements any of the various functions shown in FIG. 2, however, may vary from context to context, implementation to implementation, and embodiment to embodiment in accordance with the various features, structures and environments set forth herein. The particular means used to implement each of the various functions shown in FIG. 2, then, could be any sort of processing structures that are capable of executing software and/or firmware logic in any format, and/or any sort of application-specific or general purpose hardware, including any sort of discrete and/or integrated circuitry residing in any sort of host system, as desired.

Various exemplary systems and processes for validating domain name services and/or other configuration information have therefore been described. The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A computer-implemented method executable by a validation system to validate domain name services data for a plurality of domains, wherein each of the plurality of domains refers to a separate service provided by a common multi-tenant application server, the method comprising:
    receiving, at the validation system, the domain name services data for each of the plurality of domains from the common multi-tenant application server;
    performing, for each of the plurality of domains, a domain name services query from the validation system to a public domain name services system;
    receiving responses from the public domain name services system at the validation system in response to the domain name services queries, wherein each of the responses comprises domain name services information about one of the plurality of domains; and
    comparing, for each of the domains, the domain name services data received from the common multi-tenant application server with the domain name services information received from the public domain name services system to thereby identify any domains having anomalies using the validation system.

2. The method of claim 1 further comprising automatically repairing the anomalies between the domain name services data received from the common multi-tenant application server and the domain name services information received from the public domain name services system using the validation system.

3. The method of claim 2 wherein the repairing comprises directing a domain name services provider system to update the domain name services information for each of the domains having anomalies, wherein the domain name services provider system is configured to propagate changes in the domain name services information to the public domain name services system.

4. The method of claim 3 wherein the repairing further comprises directing the domain name services provider system to delete the domain name services information and to re-add the domain name services data received from the common multi-tenant application server for each domain having an anomaly.

5. The method of claim 1 further comprising providing a list of the anomalies as an output from the validation system.

6. The method of claim 1 wherein the domain name services data received from the common multi-tenant application server comprises data for domains hosted by a plurality of application servers.

7. The method of claim 1 wherein the domain name services query comprises at least one of an NSLOOKUP, a PING, a HOST, and a DIG query.

8. The method of claim 1 wherein the domain name services data received from the common multi-tenant application server comprise internet protocol (IP) addresses corresponding to different applications provided by the multi-tenant application server, and wherein each of the different applications is referenced by a unique domain name.

9. The method of claim 8 wherein the performing comprises performing a separate query for each of the unique domain names, and wherein the domain name services information in the response to each separate query comprises an internet protocol (IP) address for the unique domain name.

10. The method of claim 9 further comprising, for each of the unique domains in which the IP address provided by the multi-tenant application server differs from the IP address provided by the public domain name services system, directing a domain name services provider system to update the public domain name services system with the IP address provided by the multi-tenant application server for the unique domain.

11. A data processing system to provide a plurality of services on a network using a plurality of distinct domain names that are resolvable using a public domain name services system, the system comprising:
    at least one application server having a first processor configured to provide at least some of the plurality of services via the network; and
    a configuration validator having a second processor configured to:
    communicate with the at least one application server to obtain address data for each of the plurality of distinct domain names;
    perform, for each of the plurality of distinct domain names, a domain name services query to the public domain name services system;
    receive responses from the public domain name services system comprising public address information about the plurality of distinct domain names; and
    compare, for each of the plurality of distinct domain names, the address data received from the at least one application server with the address information received from the public domain name services system to thereby identify any of the plurality of distinct domain names used by the at least one application server having anomalies.

12. The data processing system of claim 11 wherein the configuration validator is further configured to automatically repair the anomalies between the address data received from the at least one application server and the public address information received from the public domain name services system.

13. The data processing system of claim 11 wherein the at least one application server is a multi-tenant application server, wherein each of the services correspond to applications associated with one of a plurality of tenants of the multi-tenant application server, and wherein each of the services is provided by the multi-tenant application server in a unique one of the plurality of distinct domain names.

14. The data processing system of claim 11 wherein the at least one application server comprises a plurality of multi-tenant application servers, wherein each of the services correspond to applications associated with one of a plurality of tenants of the multi-tenant application servers, and wherein each of the services is provided by the multi-tenant application servers in a unique one of the plurality of distinct domain names.

15. The data processing system of claim 14 wherein each of the plurality of multi-tenant application servers are configured to share address data for each of the plurality of distinct domain names with the other multi-tenant application servers, and wherein the configuration validator obtains the address data for all of the plurality of distinct domain names from one of the plurality of multi-tenant application servers.

16. The data processing system of claim 11 wherein the configuration validator is a computer system distinct from the at least one application server.

17. A computer-implemented method executable by a validation system to validate configuration data for a plurality of services, wherein each of the plurality of services refers to a separate service provided by a common multi-tenant application server, the method comprising:

receiving, at the validation system, the configuration data for each of the plurality of services from the common multi-tenant application server;

performing, for each of the plurality of services, a query from the validation system to a publicly-available system;

receiving responses from the publicly-available system at the validation system in response to the queries, wherein each of the responses comprises information about one of the plurality of services; and comparing, for each of the services using the validation system, the configuration data received from the common multi-tenant application server with the information received from the publicly-available system to thereby identify any services having anomalies between the configuration data and the information received from the publicly-available system.

18. The method of claim 17 wherein each of the services are provided in a unique network domain identified by a domain name and a network address, and wherein the configuration data received from the multi-tenant application server comprises the network address for each of the unique network domain in which each of the services is provided.

19. The method of claim 18 further comprising, for each of the unique network domains in which the network address provided by the multi-tenant application server differs from a second network address provided by the publicly-available system, automatically directing a domain name services provider system to update the publicly-available system with the network address provided by the multi-tenant application server for the unique domain.

20. The method of claim 17 further comprising providing a list of the anomalies as an output from the validation system.

* * * * *